US005988838A

United States Patent [19]
Rudenberg

[11] Patent Number: 5,988,838

[45] Date of Patent: Nov. 23, 1999

[54] REMOTELY ACTIVATED HIGH-CANDLE POWER ILLUMINATION

[76] Inventor: Murray Rudenberg, 4446 Mistral, San Diego, Calif. 92130

[21] Appl. No.: 08/865,914

[22] Filed: May 30, 1997

[51] Int. Cl.[6] .......... B60Q 3/00

[52] U.S. Cl. .......... 362/488; 362/35; 362/287; 362/517; 362/233; 362/238; 362/241; 362/531; 362/514

[58] Field of Search .......... 362/512, 514, 362/517, 546, 488, 233, 490, 277, 280, 282, 319, 322, 323, 324, 346, 297, 396, 240, 241, 232, 238, 529, 531

[56] References Cited

U.S. PATENT DOCUMENTS

| | | | |
|---|---|---|---|
| 1,906,568 | 5/1933 | Garvin | 362/488 |
| 2,095,928 | 10/1937 | Ferguson | 362/249 |
| 3,117,302 | 1/1964 | Cardarelli et al. | 362/249 |
| 4,423,472 | 12/1983 | Duthu | 362/184 |
| 4,433,362 | 2/1984 | Ban | 362/86 |
| 4,722,030 | 1/1988 | Bowden | 362/69 |
| 4,779,168 | 10/1988 | Montgomery | 362/66 |
| 4,981,363 | 1/1991 | Lipman | 362/68 |
| 5,031,082 | 7/1991 | Bierend | 362/233 |
| 5,195,813 | 3/1993 | Brown | 362/61 |
| 5,607,217 | 3/1997 | Hobbs, II | 362/35 |

OTHER PUBLICATIONS

D–Mail Catalog, vol. 141, p. 51.

*Primary Examiner*—Thomas M. Sember
*Attorney, Agent, or Firm*—Fitch, Even, Tabin & Flannery

[57] ABSTRACT

A method of illuminating a region outside an automobile involves activating at least one lamp within the automobile; and illuminating, in response to the activating of the at least one lamp, the region outside the automobile. The region extends from the automobile to at least 15 to 30 feet or more from the automobile, and the illuminating includes projecting light from the lamp within the automobile to the region outside the automobile. Preferably, the illuminating includes projecting light that illuminates an area at an average maintained luminance of at least 0.2 foot-candles at a distance of 15 to 30 feet or more from the lamp. An apparatus for carrying out this method employs at least one lamp; a remotely-controlled switch coupled to the lamp; a power source selectively coupleable through the remotely-controlled switch to the at least one lamp; a housing coupled to the at least one lamp; and at least one hook coupled to the housing for suspending the housing within an automobile.

15 Claims, 9 Drawing Sheets

REMOTELY ACTIVATED HIGH-CANDLE POWER ILLUMINATION

BACKGROUND OF THE INVENTION

The present invention relates to remotely-activated illumination, and more particularly to remotely-activated high-candle power illumination for automobiles. Even more particularly, the present invention relates to remotely activated high-candle power illumination approaches for areas around automobiles for increasing personal safety.

Personal safety is of increasing public concern as crimes against individuals, and in particular, violent crimes against individuals, continue to claim their place as part of modern society. Various approaches have been introduced in the automobile and home arenas, such as intrusion alarms, panic buttons, illuminated entry systems, auto headlamp delay systems, pepper spray, stun guns and other personal weaponry, in attempts to increase personal safety.

Problematically, intrusion alarms, while potentially effective, are primarily directed to protecting property rather than individuals, and therefore are of limited value in protecting individuals. Panic buttons require that the user recognize and react to a potential danger, and thus are generally ineffective in truly surprise attacks.

Auto lamp-delay systems unfortunately only provide uni-directional illumination outside the front end of the vehicle for a specified period of time while the user exits the vehicle following the vehicle's key being turned to an off position. Auto lamp-delay systems do not provide any illumination as the user returns to and enters the vehicle.

Illuminated entry systems, while, unlike auto lamp-delay systems, potentially provide both entry and exit illumination, unfortunately illuminate only the interior of the vehicle using what is typically no more than a 20 watt unreflected diffuse light source in a translucent casing, and therefore provide little or no deterrence to would-be attackers in areas outside the vehicle.

Problematically, personal weaponry generally requires close proximity to or contact with the user with the intended target and, obviously, prior recognition of the target by the user. Thus personal weaponry not only suffers from requiring close proximity to or contact with the attacker, thus potentially increasing danger to the user, but requires that the user become aware of the attacker, recognize the attacker as an attacker, prepare the personal weaponry for use, move into close proximity to the attacker, and activate the personal weaponry. As a result, personal weaponry may be ineffective or less effective than needed in a wide range of circumstances, such as in the case of a surprise attack, and may pose unnecessary danger to the user, such as where the attacker is able to turn the personal weaponry against the user or to attack the user before he or she can activate the personal weaponry. Furthermore, personal weaponry generally requires training for safe operation, and may not be readily available to all who need it, either due to cost, or governmental restrictions or licensing requirements.

Thus, there is a significant need for innovation in the area of personal safety, particularly with respect to automobiles, that provides effective protection both in entry and exit situations, that does not require special training or licensing, or close proximity to a would-be attacker in order to be effective. Further what is needed, is an approach specifically aimed at providing personal safety, as opposed to protecting property.

A further problem presently facing the operator of an automobile is poor street lighting. As municipalities attempt to reduce costs by seeking out and using more energy efficient and generally less bright street lighting schemes, users are frequently faced with entering and exiting their vehicles in poor lighting situations. Thus, in addition to the above-mentioned personal safety need, which is increased in poor lighting situations, there is a need for improved lighting for exterior regions about an automobile as the user of the automobile enters and exits. Furthermore, such need extends to emergency situations in which mechanical, electrical or other vehicle failures may necessitate stopping the vehicle in unlit or poorly lit situations, so that, for example, repair or diagnosis can be effected, such as the changing of a flat tire. Solutions to such lighting needs can further be of benefit in situations such as, for example, when loading or unloading of the vehicle must occur, such as loading or unloading groceries, or when passengers must embark or disembark in situations where uneven pavement, curbing or unpaved areas are present.

Various prior art lighting systems have been proposed, such as controlling a spotlight on a boat or automobile, in order to provide for personal safety. U.S. Pat. No. 4,779,168 (Montgomery) and U.S. Pat. No. 4,722,030 (Bowden) each show examples of these types of systems. These systems, however, problematically require expensive and specialized hardware integrally associated with the automobile or boat and that is not commonplace or readily available to the average vehicle user.

Thus, significant problems remain and a need for improvement exists in the field of personal safety with respect to automobiles and other vehicles. The present invention advantageously addresses the above and other needs.

SUMMARY OF THE INVENTION

The present invention advantageously addresses the needs above as well as other needs by providing an approach for remotely activated high-candle power illumination of areas around automobiles and for increasing personal safety.

In accordance with one embodiment, the invention can be characterized as a method of illuminating a region outside a vehicle, at an average maintenance illuminance of at least 0.2 foot-candles are measured at a point 15 feet from the lamp at at least 180 degrees and preferably 360 degrees around the vehicle. The method involves activating at least one lamp, such as a Halogen or Krypton lamp, within the vehicle; and illuminating, in response to the activating of the at least one lamp, the region outside the vehicle. The region extends from the vehicle to at least 15 to 30 feet from the vehicle. The illuminating of the region outside the vehicle includes projecting light from the lamp, which is located within the vehicle's cabin to the region outside the vehicle.

In another embodiment, the invention can be characterized as a remotely-controlled high-candlepower illumination system. The system employs at least one lamp, preferably illuminating an area at at least an average maintained illuminance of 0.2 to 1 foot-candles at a distance of 15 feet or more from the lamp; a remotely-controlled switch coupled to the lamp; a power source selectively coupleable through the remotely-controlled switch to the at least one lamp; a housing coupled to the at least one lamp; and at least one hook coupled to the housing for suspending the housing within a vehicle.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE PREFERRED EMBODIMENTS

The following description of the presently contemplated best mode of practicing the invention is not to be taken in a limiting sense, but is made merely for the purpose of describing the general principles of the invention. The scope of the invention should be determined with reference to the claims.

Figure 1A:
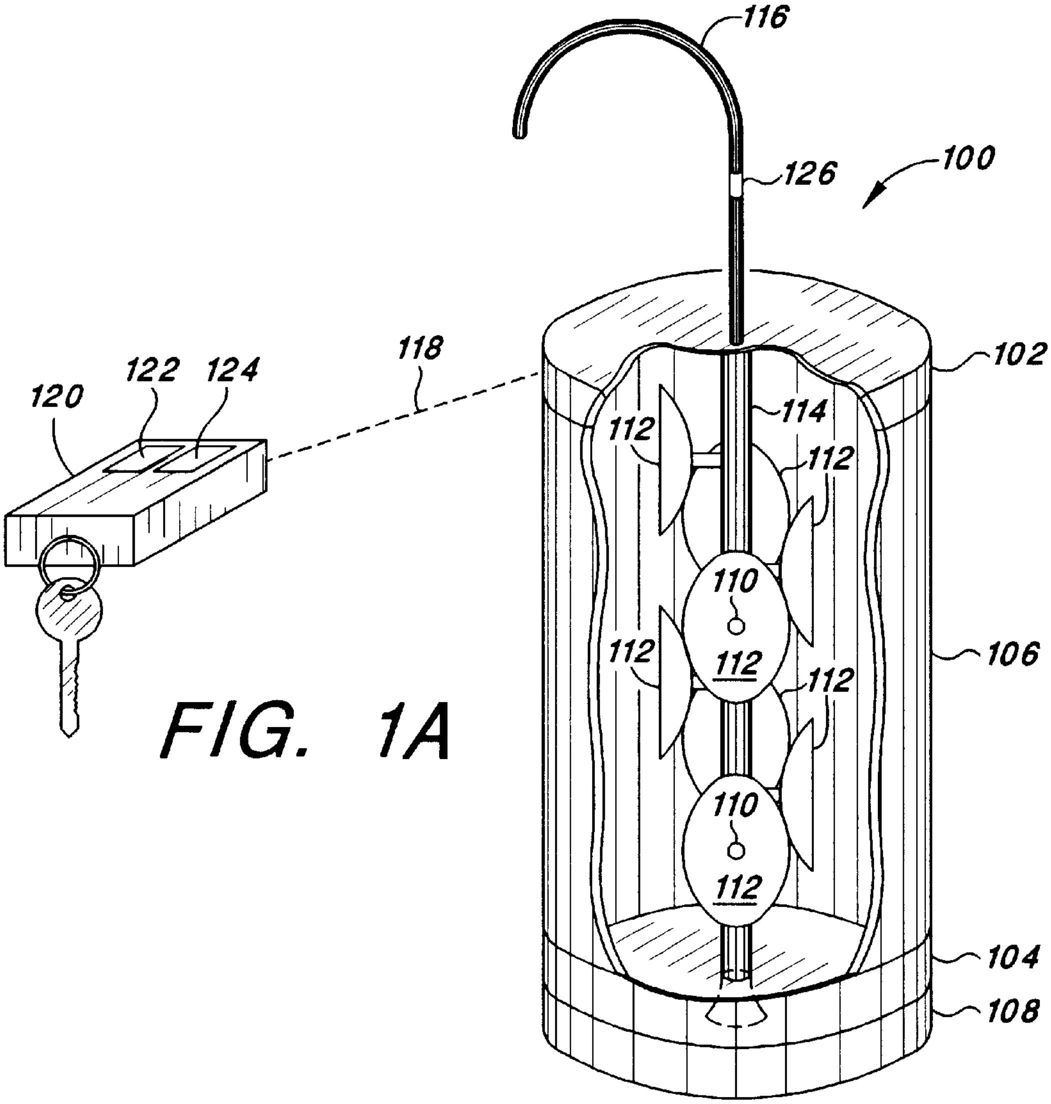
FIG. 1A is a perspective view, partially cut away, of one embodiment of a remotely-activated, high-candlepower illumination system for an automobile in accordance with the present invention.

Referring first to FIG. 1A, a perspective is shown, partially cut away, of one embodiment of the remotely activated, high-candlepower illumination system 100 for an automobile. Shown are a top housing 102, a bottom housing 104, a transparent cylindrical globe 106, an electronics housing 108, a plurality of lamps 110 and corresponding reflectors 112, a central post 114, a hook 116, a radio frequency communication channel 118, and a radio frequency transmitter 120. The lamps 110 are supported by the post 114, and are distributed about the post in a spiraling pattern.

In practice, a receiver (not shown) within the electronics housing 108 receives signals from the transmitter 120 via the radio frequency communications channel 118 in the form of "on" signals, and "off" signals, much in the same way as "arm" signals and "disarm" signals are transmitted from, e.g., a key fob transmitter to a receiver in an automobile alarm system, such as is well known in the art. Upon receipt of an "on" signal, the receiver controls an electronic switch (not shown) within the electronics housing (108) to connect power from a battery (not shown) within the electronic housing 108 to the lamps 110, causing them to emit a high-candlepower diffuse light pattern uniformally in all directions about the remotely-activated, high-candlepower illumination system 110. Upon receipt of an "off" signal from the transmitter 120, the receiver controls the electronic switch to disconnect power from the lamps 110, causing them to extinguish. The "on" signal and the "off" signal are transmitted through the communications channel 118 by the transmitter 120 in response to depressions of on and off buttons 122, 124, respectively, located on the transmitter 120.

During operation, the hook 116 is used to hang the remotely activated, high-candlepower illumination system 100 at a location within a vehicle, such as within the cabin of an automobile, for example, from a rear view mirror. In variations of the present embodiment a lanyard, rope, chain or other means may be used in lieu of the hook 116.

Advantageously, the embodiment illustrated requires no power from the automobile instead preferably utilizing power from a battery within the electronics housing 108 to provide power. Therefore advantageously, operation of present embodiment does not pose a risk of draining the vehicle's battery. In alternative embodiments, however, and if desirable for particular applications, the vehicle's battery power may be utilized, such as through a cigarette lighter adaptor.

Further advantageously, the communications channel used by the remotely-activated, high-candlepower illumination system 100 consists of air, and possibly other structures between the electronics housing 108 and the transmitter 120. The communications channel 118 can, in accordance with the present embodiment, be from fifteen to thirty feet or more in length (from 4 meters to 10 meters or more in length), for example, twenty feet or more in length (or 6 meters or more in length), thereby allowing an operator of the vehicle, for example, to activate the remotely-activated high-candlepower illumination system 100 from a point remote from the user's automobile (or other vehicle, such as a boat, bus, truck, trailer or the like). As a result of this remote activation, a safe and well-illuminated environment surrounding the vehicle is assured upon approach of the user to the vehicle. Further, a flash circuit implemented with a suitable timer may be implemented for activation in response to a "panic signal", which may be initiated by the transmitter 120, for example, in response to a depression of both the "on" and "off" buttons 122, 124 simultaneously or by a depression of a panic button (not shown). Advantageously, the flash circuit can be employed in emergency situations to attract attention and to discourage would-be attackers. Finally, a manual on/off switch (not shown) on the bottom housing 104 or electronics housing 108 connected in parallel and/or series with the electronic switch, may be used to manually activate or deactivate the lamps 110 from the remotely-activated high-candlepower illumination system 100.

The light emitted from the lamps 110 have a total candlepower at the lamps 110 of at least 30,000 to 500,000, for example at least 100,000 candlepower, for example, 300,000 candlepower with the lamp's 110 providing illumination at an average maintained illuminance of from between 0.2 to 1 and 2 to or more foot candles at a point from between 15 and 30 feet or more from the lamps. (See, for example, Rea, LIGHTING HANDBOOK, 8th Ed., which specifies 0.5 foot candles as an average maintained illuminance for use in security lighting, parking lots and the like). The lamps 110 are preferably Halogen, Krypton, or other high-output lamps, such that a maximum candlepower output is achieved by the remotely-activated, high-candlepower illumination system 100 with minimal current draw.

The reflectors 112 are tailored so as to, in conjunction with one another, spread clear light 360 degrees about the remotely activated, high-candlepower illumination system 100, while individually acting to make maximal use of the light emitted from each respective lamp 110. The reflectors 112 may be of any shape suited to achieve the above functions, such as square, conical (or funnel-shaped), parabolic, hyperbolic, elliptical, hemi-spherical, hemi-cylindrical, and the like. The angle of the reflectors may be charged by fixing their lower edges to the lower housing 104 (or possibly an upper edge at an adjacent reflector) using control rods (not shown) and raising or lowering the post 114 by for example turning a threaded thumbscrew on the lower housing.

The top and bottom housings 102, 104, the electronics housing 108 and the transparent cylindrical globe 106 together determine the overall dimensions of the remotely-activated, high-candlepower illumination system, which is preferably small enough to conveniently fit within, and be supported by the interior of an automobile, such as hanging from a rear-view mirror. Such dimensions may be, for example, a diameter of from between 3 inches to 7 inches, and 12 inches to 20 inches, for example, from between 5 inches and 15 inches, for example, 10 inches, and a height of from between 5 inches to 10 inches, and 20 inches to 30 inches, for example, from between 7 inches and 25 inches, for example, 15 inches.

The receiver, which receives the "on" signals and the "off" signals, and controls the electronic switch so that power is applied to or disconnected from the lamps 110, is preferably a radio frequency receiver, but may be an infrared receiver, an ultrasonic receiver, or the like if paired with an appropriate transmitter in a particular application.

The hook 116 is preferably plastic, or rubberized metal, and is selected so as to prevent damage to the interior of the vehicle in which the present embodiment is utilized. The hook 116 is fixed to the upper housing 102, and advantageously includes a hinge 126 at its center (or alternatively at its junction with the upper housing 112) so that it can be folded down into a storage position while not in use. Alternatively, and instead of the hook 116, a lanyard, rope or chain may be employed by which the remotely-activated high-candlepower illumination system 100 may be suspended.

Figure 1B:
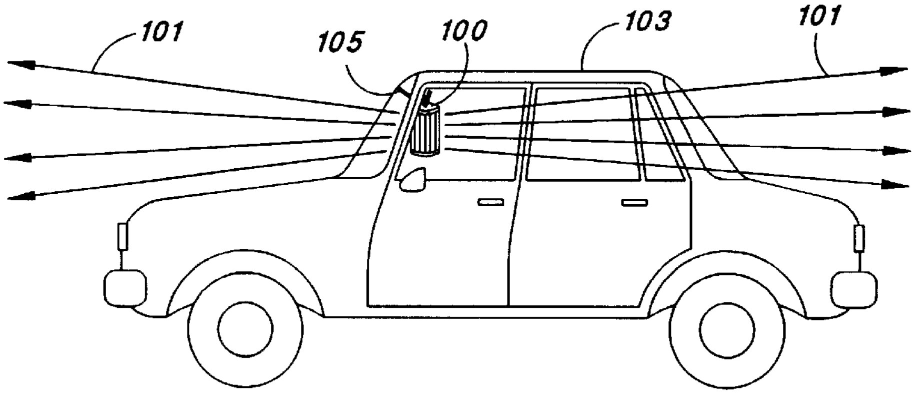
FIG. 1B is a side-perspective view of one embodiment of the remotely-activated, high-candlepower illumination system of FIG. 1A in an automobile in accordance with one embodiment.
Figure 1C:
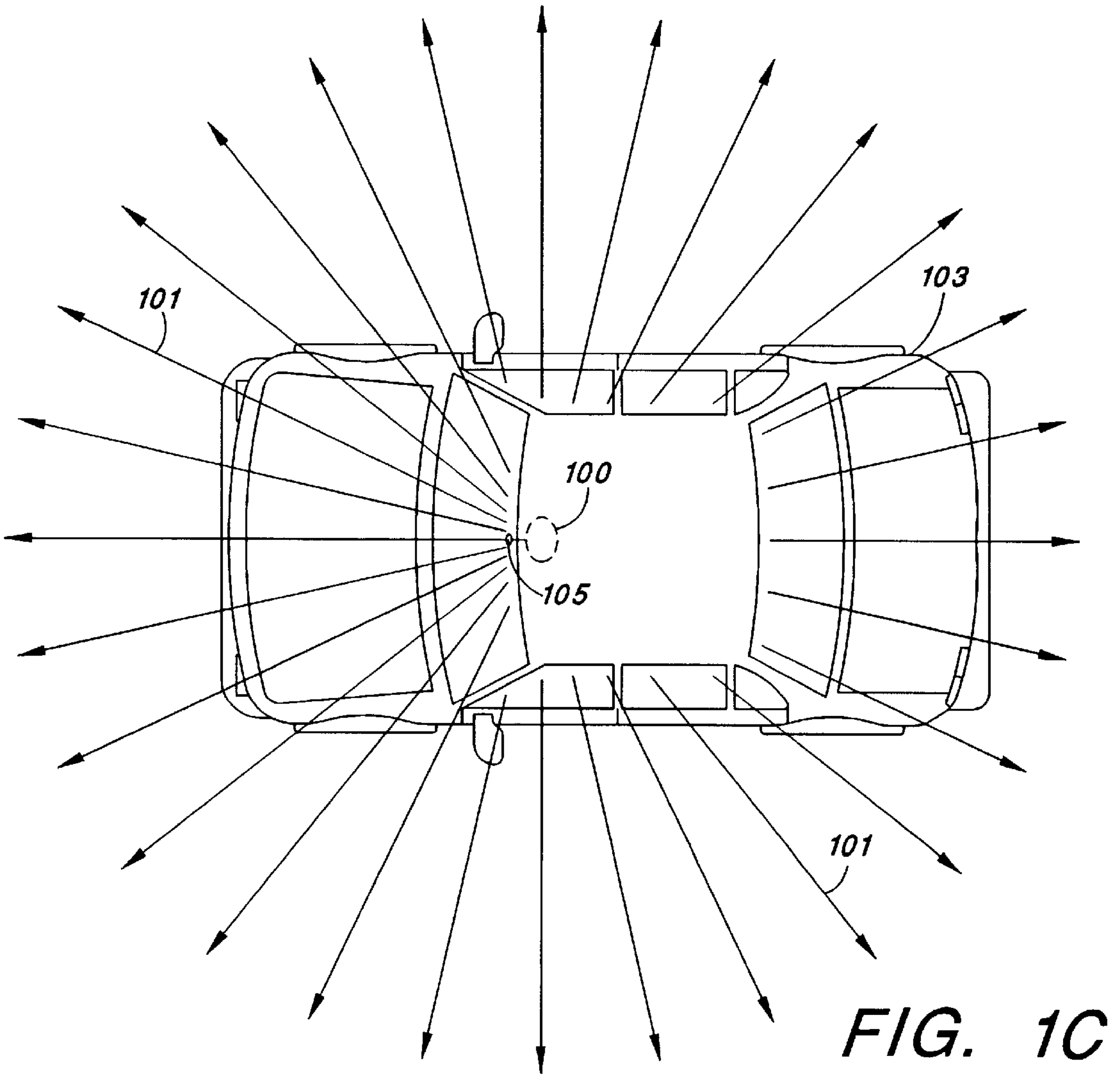
FIG. 1C is a top perspective view of one-embodiment of the remotely-activated high-candlepower illumination system of FIG. 1B in an automobile.

Referring next to FIGS. 1B and 1C, a side and top perspective view, respectively, as shown in accordance with one embodiment of the system of FIG. 1A. The remotely-activated high-candlepower illumination system 100 is hanging on a rear view mirror 105 within an automobile 103. The light 101 is projected from within the automobile 103 greater than 180° and up to 360° outside of the automobile. As shown, the light 101 extends a certain range outside of the automobile 103 to illuminate objects or persons with the region surrounding the automobile 103.

Figure 2:
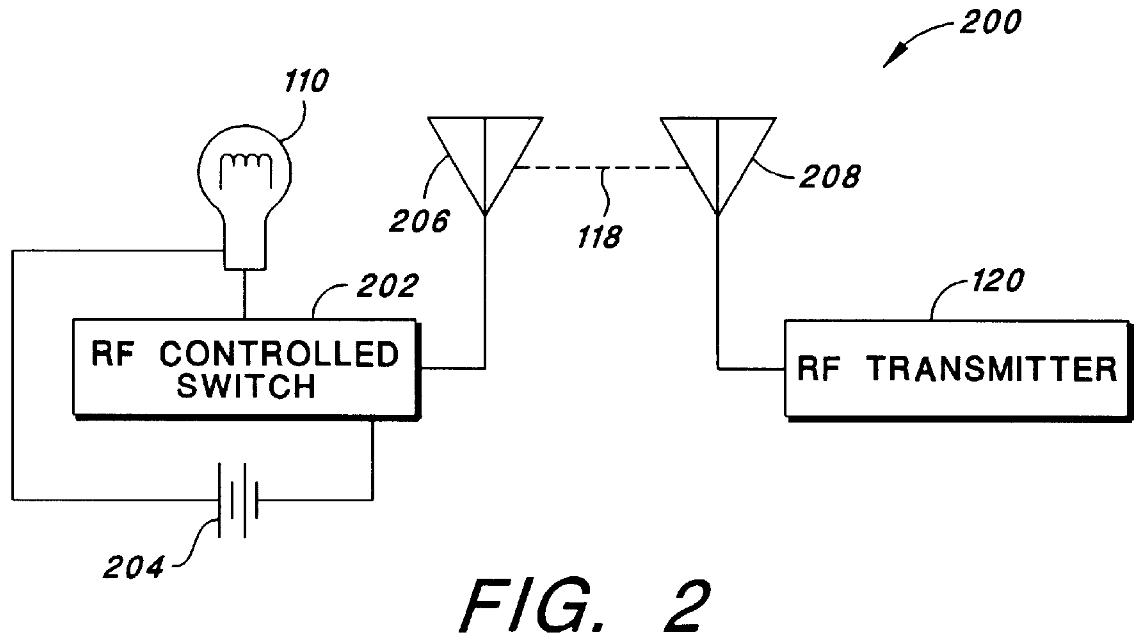
FIG. 2 is a schematic diagram showing one variation of an electrical system employed in the remotely-activated, high-candlepower illumination system of FIG. 1A.

Referring next to FIG. 2, a schematic diagram is shown of one variation of an electrical subsystem 200 employed in the remotely activated, high-candlepower illumination system. Shown are the receiver and electronic switch (or radio frequency controlled switch 202), the battery 204, a lamp 110 (or, in accordance with various embodiments, an array of such lamps), a receiver antenna 206, the communications channel 118, a transmitter antenna 208, and the transmitter 120.

The lamp 110, the receiver and electronic switch 202, and the battery 204 are connected in a series combination. The receiver antenna 208 is connected to the receiver and electronic switch 202, and the transmitter antenna 208 is connected to the transmitter 120.

In operation, the transmitter 120 transmits the "off" signals and the "on" signals to the receiver 202 via the communications channel 118 in response to depressions of the on and off buttons, respectively, located on the transmitter 120. Upon receipt of an "on" signal, the receiver controls the electronic switch to connect power from the battery 204 to the lamp 110, causing it to emit a high-candlepower clear light pattern extending over, for example, a 180 to 360 degree range about the remotely-activated, high-candlepower illumination system. Upon receipt of an "off" signal from the transmitter 120, the receiver controls the electronic switch to disconnect power from the lamp 110, causing it to extinguish. Note that while a single lamp is depicted, a plurality of lamps (such as in FIG. 1A) may be controlled independently and/or as a group using either a single radio frequency controlled switch or a separate radio frequency controlled switch for each lamp. Similarly, an electronic dimmer switch may be employed in lieu of the radio frequency controlled switch to selectively dim the lamps either independently or as a group in response to for example, a "dim" signal and a "brighten" signal transmitted by the transmitter in response to a depression of a dim or brighten button, respectively.

Figure 3:
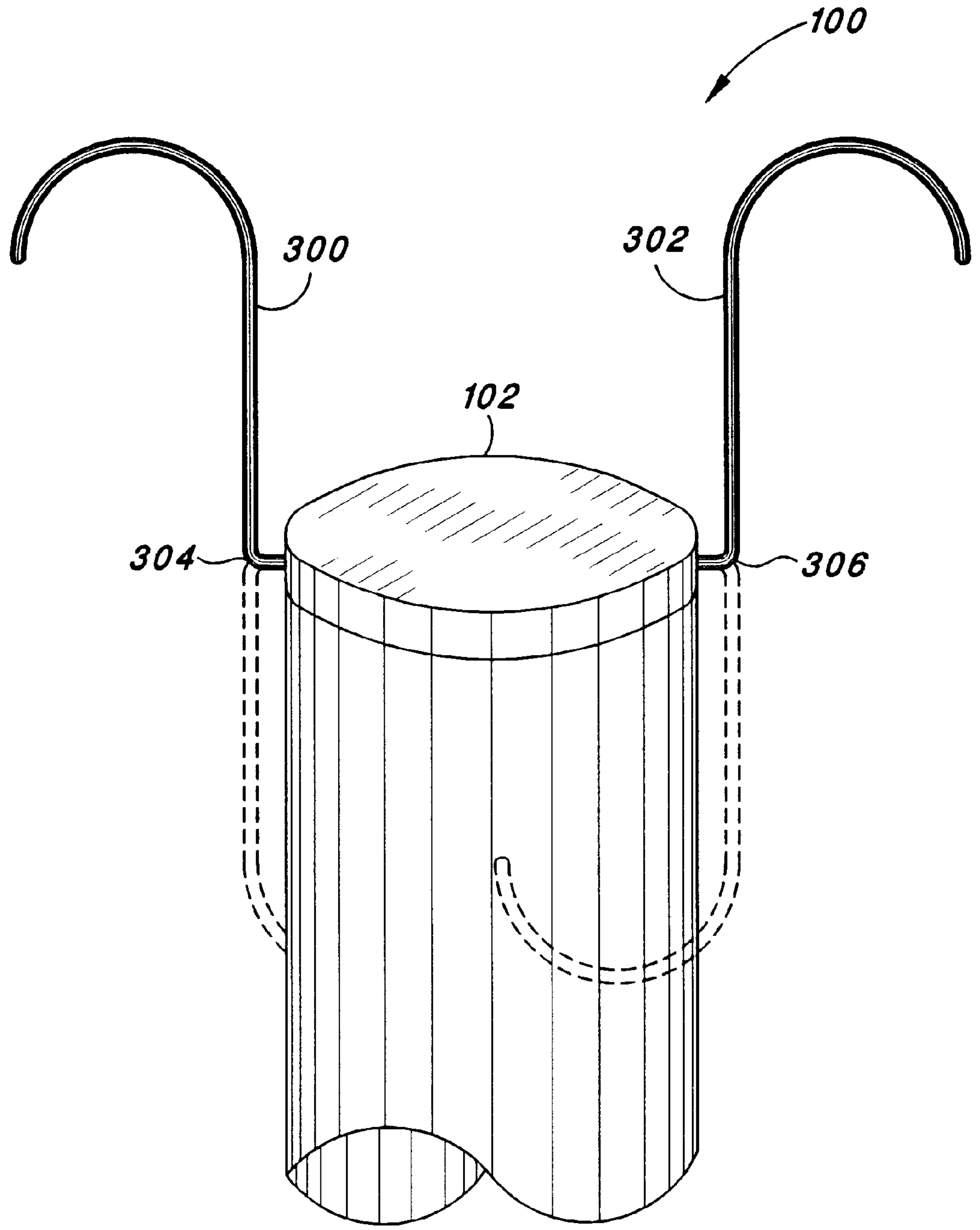
FIG. 3 is a partial perspective view of the remotely-activated, high-candlepower illumination system of FIG. 1A illustrating a pair of folding hooks useable for hanging the remotely-activated, high-candlepower illumination system in, for example, an automobile.

Referring next to FIG. 3, a partial perspective view is shown of the remotely-activated, high-candlepower illumination system 100 illustrating a pair of folding hooks 300, 302 useable for hanging the remotely-activated, high-candlepower illumination system 100 in, for example, an automobile.

During operation, the hooks 300, 302 are used to hang the remotely activated, high-candlepower illumination system 100 at a location within a vehicle, such as within the cabin of an automobile, for example, from a rear view mirror.

The hooks 300, 302 are preferably plastic, or rubberized metal and are selected so as to prevent damage to the interior of the vehicle in which the present embodiment is utilized. The hooks 300, 302 are fixed to the upper housing 102 at its periphery, and include respective hinges 304, 306 at their respective junctions with the upper housing 102 so that the hooks 300, 302 can be folded down into a storage position while not in use. The hooks 300, 302 are represented in the storage position using dashed lines in FIG. 3.

Figure 4:
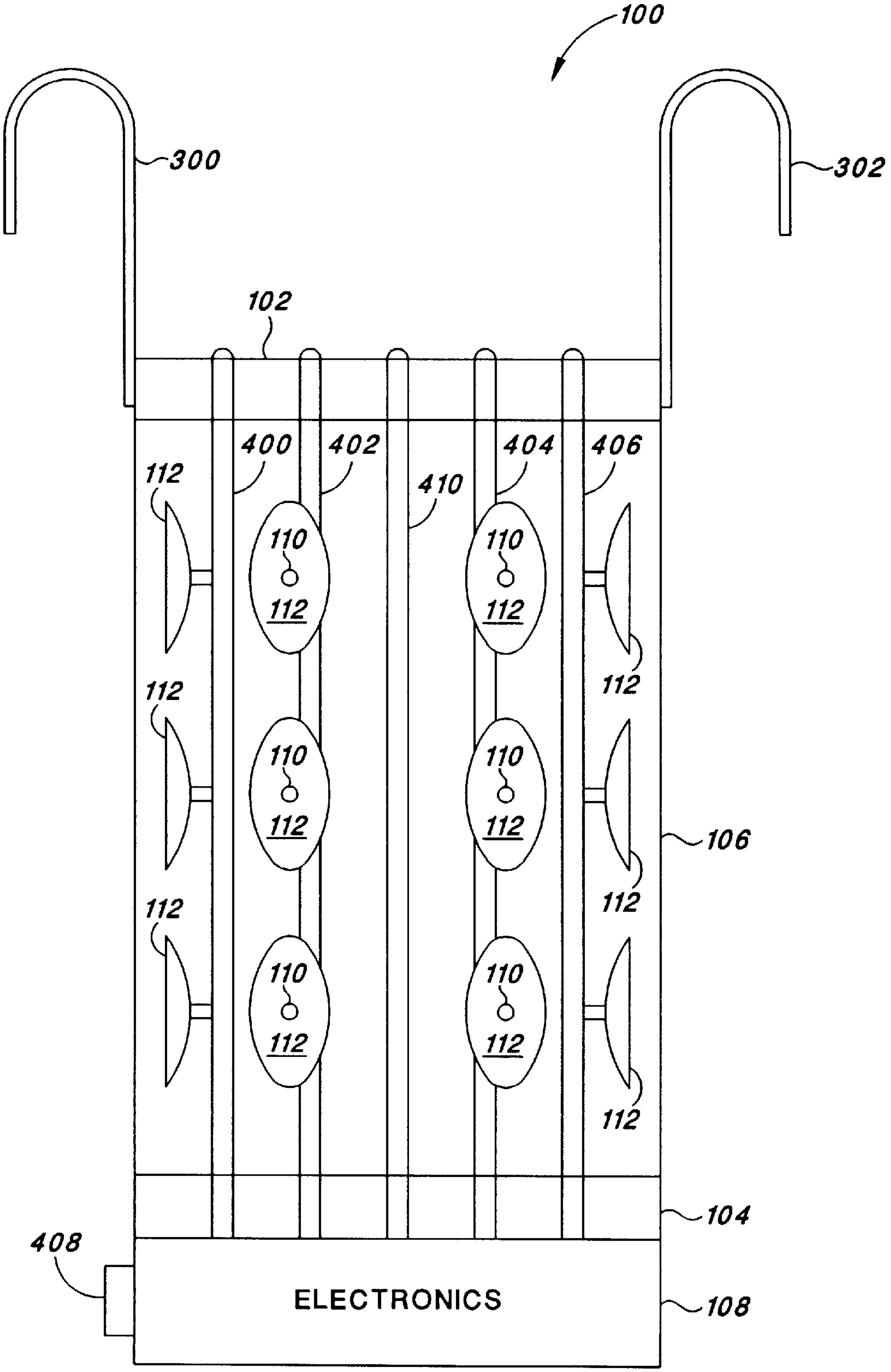
FIG. 4 is a side view of an additional embodiment of the remotely-activated high-candlepower illumination system of FIG. 1A wherein rows of lamps and reflectors arranged on a plurality of vertical posts within a transparent cylindrical globe direct illumination over a 360 degree range.

Referring next to FIG. 4, a side view is shown of an additional embodiment of the remotely-activated high-candlepower illumination system 100. Shown are the upper and lower housings 102, 104, the electronics housing 108, the transparent cylindrical globe 106, the lamps 110, the reflectors 112, and the pair of hooks 300, 302. In the embodiment shown, plurality of posts 400, 402, 404, 406, for example, four posts 400, 402, 404, 406 each support three lamps 110, with corresponding reflectors 112. A control port 408 houses the manual switch, if present, for manually controlling the lamps, including possibly turning on and off individual lamps or the lamps as a group and/or for dimming or brightening individual lamps or the lamps as a group, and a connector to which an external power source, such as power from the vehicle's battery or an A.C. adapter, may be connected to the remotely-activated high-candlepower illumination system 100. Also shown is a central post 410, which serves to hold the upper and lower housings 102, 104 together with the transparent cylindrical globe 106 interposed posed thereinbetween.

The illumination properties of the remotely-activated high-candlepower illumination system 100 of FIG. 4 are similar to those described hereinabove with respect to FIG. 1A.

Figure 5:
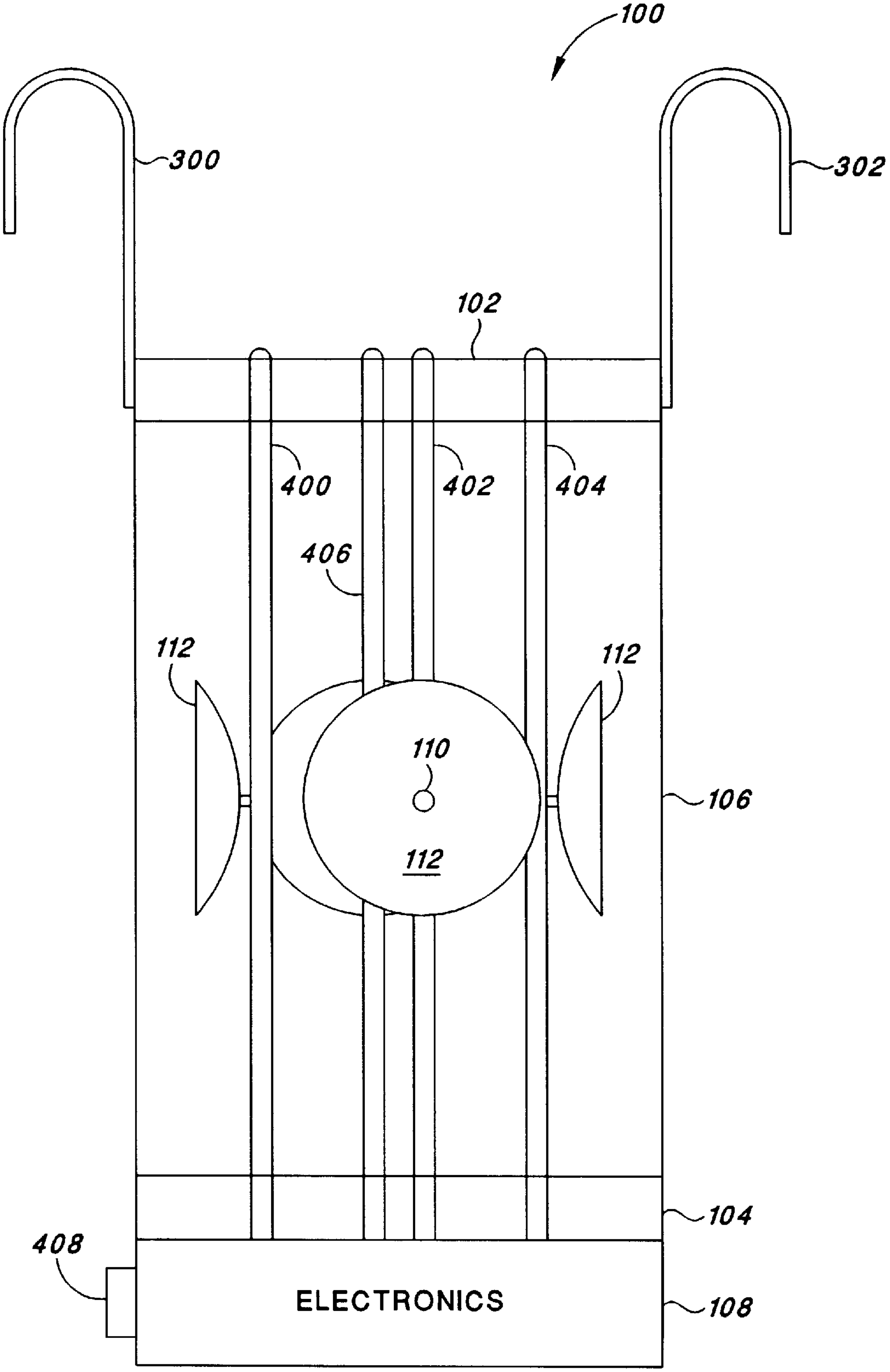
FIG. 5 is a side view of a further embodiment of the remotely-activated, high-candlepower illumination system of FIG. 1A wherein a single row of lamps and reflectors arranged on a plurality of vertical posts within a transparent cylindrical globe direct illumination over a 360 degree range.

Referring next to FIG. 5, a side view is shown of a further embodiment of the remotely-activated, high-candlepower illumination system 100. Shown are the upper and lower housings 102, 104, the electronics housing 108, the transparent cylindrical globe 106, the lamps 110, the reflectors 112, the pair of hooks 300, 302, the posts 400, 402, 404, 406 and the control port 408. In the embodiment shown, the plurality of posts 400, 402, 404, 406, in this case, four posts 400, 402, 404, 406 each support a single lamp 110 and corresponding reflector 112.

The lamps shown in FIG. 5 have illumination properties similar to lamps described in reference to FIG. 1A.

Figure 6:
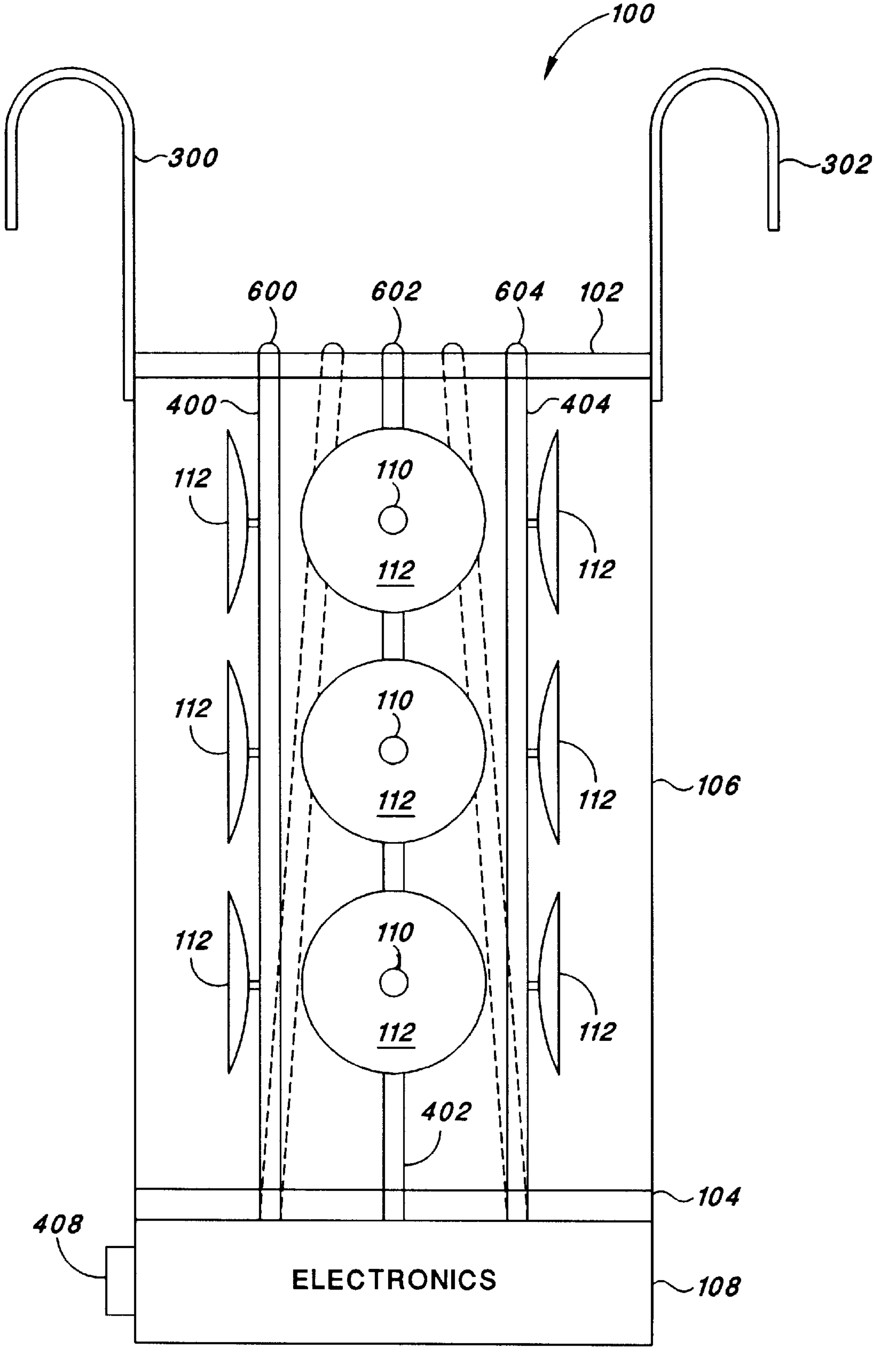
FIG. 6 is a side view of another embodiment of the remotely-activated, high-candlepower illumination system of FIG. 1A wherein rows of lamps and reflectors arranged on a plurality of posts within a transparent cylindrical globe direct illumination over a 360 degree range, wherein the posts are adjustable from vertical to several degrees off-vertical in order to direct the light more upwardly or more downwardly.

Referring next to FIG. 6, a side view is shown of another embodiment of the remotely-activated, high-candlepower illumination system 100. Shown are the upper and lower housings 102, 104, the electronics housing 108, the transparent cylindrical globe 106, lamps 110, corresponding reflectors 112, the plurality of posts 400, 402, 404, 406, in case four posts, 400, 402, 404, (with the fourth post 406 being hidden from view in FIG. 6 behind the post 402) the hooks 300, 302 and the control port 408. In the embodiment shown, a plurality of posts 400, 402, 404 each support three lamps 110, and corresponding reflectors 112.

The lamps 110 have illumination properties, most of those described hereinabove with respect to FIG. 1A.

As shown in FIG. 6, a control knob 600, 602, 604 at respective upper ends of each of the posts 400, 402, 404 when loosened, permits the corresponding posts to slide within a slot in the upper housing 102. With a basal end of each post 400, 402, 404 hinged in the lower housing 104, this slidable movement in the slot in the upper housing 102 results in an angular displacement of the posts, and as a result the lamps 110 and reflectors 112 are affixed thereto. Thus, the direction in which light is emitted from the remotely-activated high-candlepower illumination system 100 can be adjusted by adjusting the angle of the posts 400, 402, 404 after loosening the control knob 602, 604 associated therewith. Displacement of two of the posts 400, 404 is depicted in FIG. 6 using dashed lines.

The control knob 600, 602, 604 may be a knurled thumbscrew, that frictionally engages the upper housing 102 when tightened; a spring loaded clamp that opens into teeth in the slot in the upper housing 102 when released, but that permits slidable movement of the posts 400, 402, 404 when compressed, such as with the user's fingers; or a rubberized knob that frictionally engages interior edges of the slots in the upper housing 102 and can be moved with pressure applied radially to the upper ends of the posts 400, 402, 404 (and possibly while squeezing the rubberized knob).

Alternatively, there may be similar control knobs (not shown) at basal ends of the posts 400, 402, 404 such that more extreme angular deflection of the posts 400, 402, 404 may be achieved. In particular variations, the control knobs at the basal ends of the posts, which control the movement of the basal ends of the posts 400, 402, 404 in slots in the lower housing 104, may be more permanent in nature, such as thumbscrews or even conventional screws requiring a screw driver to loosen, whereas the control knobs 600, 602, 604 at the upper ends of the posts 400, 402, 404 may be selected to be easily adjusted, such as spring-loaded clamps, whereby a general preferred angle for the posts 400, 402, 404 may be selected using the lower control knobs, with periodic fine tuning occurring using the upper control knobs 600, 602, 604. When lower control knobs are employed, appropriate openings in the electronics housing 108 are made to provide access to the lower control knobs and to permit the basal ends of the posts 400, 402, 404 to move in the slots within the lower housing 104.

Figure 7:
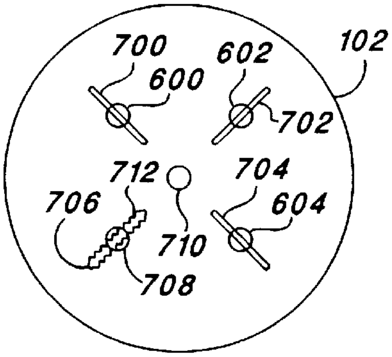
FIG. 7 is a top view of the embodiment of the remotely-activated, high-candlepower illumination system of FIG. 6 showing slots in a top housing and adjustors used to adjust the posts from vertical to off-vertical in order to direct light in a desired pattern.

Referring next to FIG. 7, a top view is shown of the embodiment of the remotely-activated, high-candlepower illumination system 100. Shown are the slots 700, 702, 704, 706, in the upper housing 102, the control knobs 600, 602, 604, 708 at the upper end of each of the posts 400, 402, 406 (see FIG. 6) and an additional post (hidden by the post 402 in FIG. 6) and an upper end of a center post 710 (also hidden in FIG. 6 by the post 402). As can be seen, the control knobs 600, 602, 604, 708 each control movement of a respective post within a respective slot 700, 702, 704, 706 in the upper housing. Note that the slot 708 is shown as having teeth 712 such as would be the case in variations employing the above-mentioned spring-loaded clamp-type control knob. The other slots 700, 702, 704 are shown without teeth such as would be the case in other variations described herein.

Figure 8:
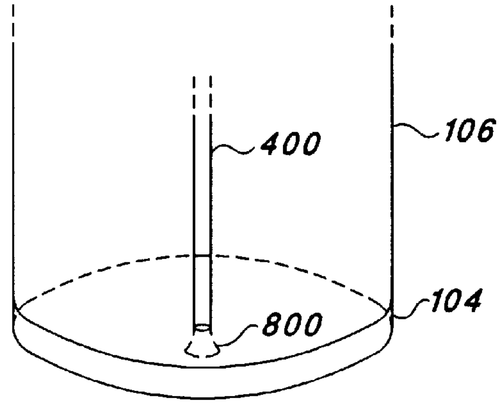
FIG. 8 is a partial perspective view of a variation of the embodiment of the remotely-controlled, high-candlepower illumination system of FIG. 6 showing a pivot at a base end of one of the posts connected to a bottom housing.

Referring next to FIG. 8, a partial perspective view is shown of a variation of the embodiment of the remotely-controlled, high-candlepower illumination system. Shown is the lower housing 104, a portion of the transparent cylindrical globe 106, and one of the posts 400. Also shown is a hinge 800 at which the post pivots at the lower housing 104 when adjusted within the slot of the top housing. The hinge 800 is omitted in variations where slots in the lower housing 106 are also employed to permit movement of the basal ends of the posts within the slots in the lower housing when respective control knobs are activated.

Figure 9:
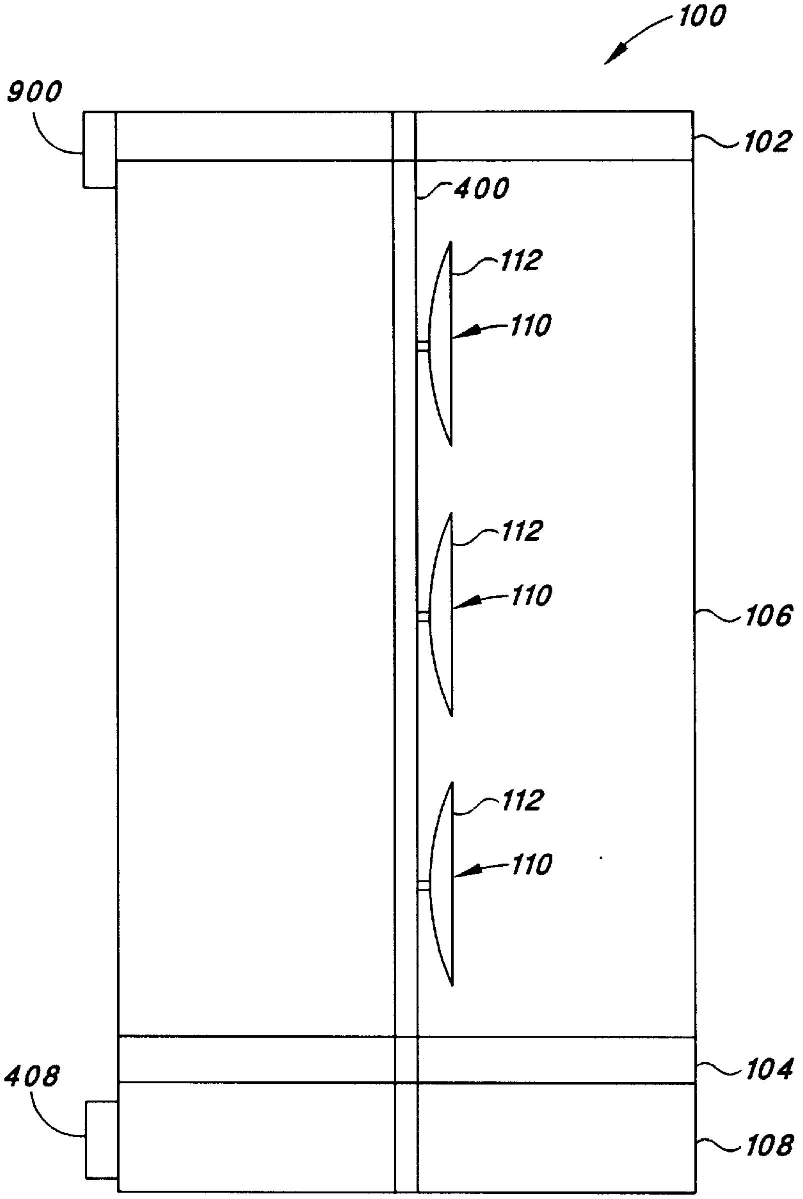
FIG. 9 is a side view of another further embodiment of the remotely-activated, high-candlepower illumination system of FIG. 1A wherein rows of lamps and reflectors arranged on a single of vertical post within a transparent globe direct illumination over, for example, a 180 degree to 360 degree range.

Referring next to FIG. 9, a side view is shown of another further embodiment of the remotely-activated, high-candlepower illumination system 100. Shown are a single post 400, three lamps 110 and corresponding reflectors 112 mounted on the post 400, the upper housing 162, the lower housing 104, the transparent cylindrical globe 106 and the electronics housing 108.

As with the embodiments above, in practice, a receiver within the electronics housing 108 receives signals from the transmitter (not shown) via the radio frequency communications channel (not shown) in the form of "on" signals, and "off" signals. Upon receipt of the "on" signal, the receiver controls an electronic switch within the electronics housing 108 to connect power from the battery within the electronic housing 108 to the lamps 110, and upon receipt of an "off" signal from the transmitter, the receiver controls the electronic switch to disconnect power from the lamps 110, causing them to extinguish.

The embodiment shown is particularly suited for mounting in a fixed location, such as inside the windshield of an automobile, using a mounting bracket 900. The mounting bracket 900 may be mounted using any of a number of methods such as using an adhesive, such as is commonly used to affix a rear view mirror to the windshield; screws; rivets; bolts; nails; suction cup or the like.

Advantageously, power from the automobile may be used in lieu of power from the battery within the electronics housing 106, either through a direct electrical connection between the vehicle's power distribution harness and the control port 408, through a cigarette lighter adaptor, such as are common in the art or through an A.C. adapter, such as are common in the art, coupled to the control port 408.

Further advantageously, as with other embodiments described herein, the remotely-activated, high-candlepower illumination system 100 of the present embodiment is activated by transmissions in the communications channel. The communications channel can in accordance with the present embodiment be thirty feet or more in length, thereby allowing an operator of the vehicle, for example, to activate the remotely-activated high-candlepower illumination system from a point remote from the user's automobile. As a result of this remote activation, a safe and well-illuminated environment surrounding the vehicle is assured upon approach of the user to the vehicle or departure of the user from the vehicle.

As with other embodiment, the clear illumination provided by the lamps preferably illuminates an area at a minimum average maintained illuminance of at least 0.2 foot-candles from a distance of from at least 15 to 30 feet or more. The lamps 110 are preferably Halogen, Krypton, or other high-output lamps, such as those mentioned above.

Advantageously, the embodiment shown may also be employed outside of a vehicle, such as mounted on a vehicle's hood, roof, or trunk, may be used outside or inside a building or may be used in a portable, i.e., not mounted from. When used outside a building, appropriate design changes, such as are known in the art, to allow operation from a 120 volt alternating current electrical supply may be made, or an appropriate power adaptor, e.g., 120 volt A.C. to 12 volt D.C. (the standard to automobiles), may be employed. When used in a portable form, or even in a building or in an automobile, the radio controlled electronic switch may be omitted and only the manual switch in the control port may be used. In this variation, the manual switch may be a knob with a plurality of positions for illuminating individual lamps or combinations of lamps. A separate knob may be used to dim the lamps independently, in groups, or all together.

Figure 10:
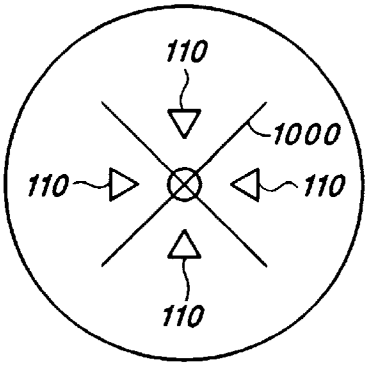
FIG. 10 is a top cross-sectional view of a quadrant reflector variation of a reflector arrangement useable with the remotely-activated, high-candlepower illumination system of FIG. 1A.

Referring next to FIG. 10, a top cross-sectional view is shown of a variation of a reflector arrangement useable with the remotely-activated, high-candlepower illumination system. In the embodiment shown a four quadrant reflector is employed. Shown is the reflector 1000, and 1000 each of four lamps 110 deployed one per quadrant about the reflector.

Figure 11:
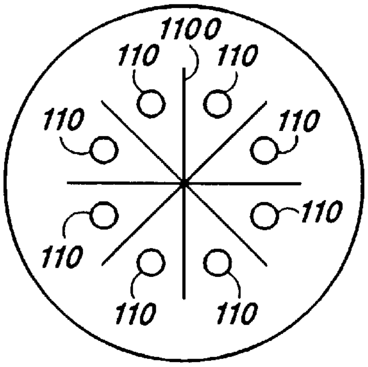
FIG. 11 is a top cross-sectional view of eight-sectioned variation of a reflector arrangement useable with the remotely-activated, high-candlepower illumination system of FIG. 1A.

Referring next to FIG. 11, a top cross-sectional view is shown of another variation of a reflector arrangement useable with the remotely-activated, high-candlepower illumination system. In the embodiment, an eight section reflector 1100 design is shown. Shown are the reflector 1100 and eight lamps 110 deployed one per sector about the reflector 1100.

Figure 12:
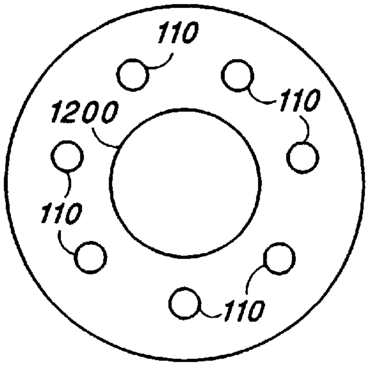
FIG. 12 is a top cross-sectional view of a cylindrical variation of a reflector arrangement useable with the remotely-activated, high-candlepower illumination system of FIG. 1A.

Referring next to FIG. 12, a top cross-sectional view is shown of a further variation of a reflector arrangement useable with the remotely-activated, high-candlepower illumination system. In the embodiment shows, a cylindrical reflector 1200 is shown. Shown are the reflector 1200, and each of eight lamps 110 deployed at equal intervals about the reflector.

Figure 13:
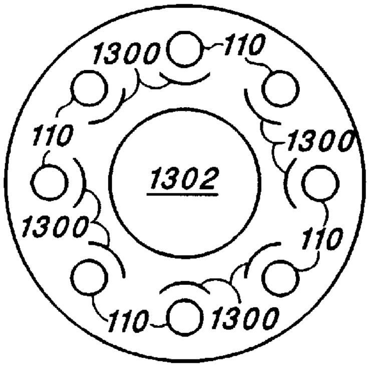
FIG. 13 is a top cross-sectional view of a cylindrical variation of an individual lamp and reflector arrangement (wherein the lamps and reflectors are possibly staggered in height) useable with the remotely-activated, high-candlepower illumination system of FIG. 1A.

Referring next to FIG. 13, a top cross-sectional view is shown of another further variation of a reflector arrangement useable with the remotely-activated, high-candlepower illumination system. In the embodiment shown an individual reflector 1300 is employed for each of eight lamps 1100. Each of the lamps is spaced about a large control column 1302, which serves to support the lamps at staggered heights (such as in a spiral pattern around and up the central column 1302 such as in the embodiment of FIG. 1) so as to accommodate the reflectors 1300.

Figure 14:
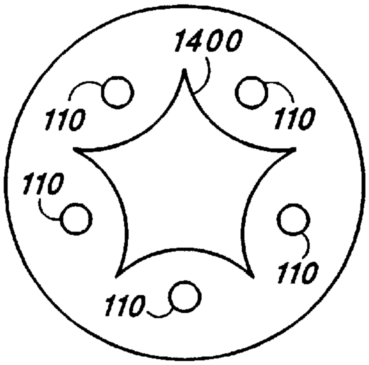
FIG. 14 is a top cross-sectional view of star-like variation of a reflector arrangement useable with the remotely-activated, high-candlepower illumination system of FIG. 1A.

Referring next to FIG. 14, a top cross-sectional view is shown of another further variation of a reflector arrangement useable with the remotely-activated, high-candlepower illumination system. In the embodiment shown a star-like reflector 1400 is employed. Shown are the reflector 1400 and five lamps 110 positioned between each of five points on the star-like reflector 1400.

Figure 15:
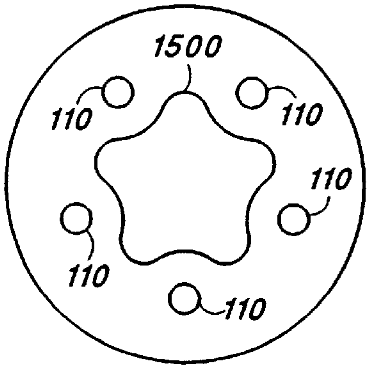
FIG. 15 is a top cross-sectional view of a curved star-like variation of a reflector arrangement useable with the remotely-activated, high-candlepower illumination system of FIG. 1A.

Referring next to FIG. 15, a top cross-sectional view is shown of a supplemental variation of a reflector arrangement useable with the remotely-activated, high-candlepower illumination system. In the embodiment shown a curved star-like reflector 1500 is employed. Shown are the reflector 1500, and each of five lamps 110 positioned between each of five curved lobes on the curved star-like reflector 1500.

While the invention herein disclosed has been described by means of specific embodiments and applications thereof, numerous modifications and variations could be made thereto by those skilled in the art without departing from the scope of the invention set forth in the claims. For example, improvements in the transmitter and receiver may permit operation over large distances, e.g., over 50 or 100 feet, and improvements in lamp design and characteristics may allow increased illuminance without unduly increasing the power required by the lamps.

An elongated design (see, for example, FIG. 11) may be selected in order to shield the lamps and minimize the surface luminescence of the luminaire, or glare; in the interest of improving visibility in the area surrounding the vehicle.

What is claimed is:

1. A method of illuminating a region outside a vehicle comprising:

receiving a signal from outside of the vehicle;

activating, in response to the receiving the signal, at least one lamp within the vehicle; and illuminating, in response to the activating of the at least one lamp, the region outside the vehicle, the region extending from the vehicle to at least 15 feet from the vehicle and at least 180 degrees around the vehicle, and the illuminating including projecting light from the lamp within the vehicle to the region outside the vehicle.

2. The method of claim 1 wherein said illuminating includes projecting light within said region at at least an average maintained illuminance of 0.2 foot candles around said vehicle.

3. The method of claim 1 further comprising:

activating a transmitter; and transmitting the signal to a receiver;

said receiving includes receiving the signal in the receiver.

4. The method of claim 3 wherein said transmitting including transmitting a radio frequency signal.

5. The method of claim 1 further comprising:

reflecting light from said lamp using a reflector.

6. The method of claim 1 wherein said illuminating comprises said illuminating, in response to said activating of said at least one lamp, said region outside said vehicle, said region extending from said vehicle to at least 15 feet from said vehicle and 360 degrees around said vehicle, and said illuminating including projecting light from said lamp within the vehicle to said region outside said vehicle.

7. A remotely-controlled high-candlepower illumination system comprising:

at least one lamp for providina illumination at least 180 degrees around an automobile;

a remotely-controlled switch coupled to the at least one lamp;

a power source selectively coupleable through the remotely-controlled switch to the at least one lamp;

a housing coupled to the at least one lamp; and means, coupled to the housing, for suspending the housing within the automobile.

8. The system of claim 7 further comprising:

a hinge interposed between at least one hook at the housing, allowing the hook to be folded against the housing.

9. The system of claim 7 further comprising:

a transmitter for sending an on signal and an "off" signal to said remotely controlled switch.

10. The system of claim 7 further comprising:

a post coupled to said housing and to which is coupled the lamp.

11. The system of claim 7 further comprising a reflector coupled to said housing for reflecting light from said lamp.

12. The system of claim 7 wherein said at least one lamp comprises said at least one lamp for providing illumination 360 degrees around an automobile.

13. The system of claim 7 wherein said means comprises a lanyard, coupled to said housing, for suspending said housing within said automobile.

14. A method of illuminating a region outside a vehicle comprising:

receiving a signal from outside of the vehicle;

activating, in response to the receiving the signal, at least one lamp within the vehicle, the at least one lamp for providing a high-candlepower diffuse 360° light pattern substantially uniformly; and illuminating, in response to the activating of the at least one lamp, the region outside the vehicle, the region extending from the vehicle to at least 15 feet from the vehicle, and the illuminating including projecting light from the lamp within the vehicle to the region outside the vehicle.

15. The method of claim 14 wherein said illuminating includes said projecting light within said region at at least said average maintained illuminance of 0.2 foot candles around said vehicle.

* * * * *

UNITED STATES PATENT AND TRADEMARK OFFICE
CERTIFICATE OF CORRECTION

PATENT NO : 5,988,838
DATED : November 23, 1999
INVENTOR(S) : Murray Rudenberg

It is certified that error appears in the above-identified patent and that said Letters Patent is hereby corrected as shown below:

Column 11 (Claim 7), line 43, "providina" should be --providing--.

Signed and Sealed this

Twenty-fifth Day of July, 2000

Attest:

Q. TODD DICKINSON

*Attesting Officer*

*Director of Patents and Trademarks*